United States Patent [19]

Hannibal

[11] 4,377,386
[45] Mar. 22, 1983

[54] LINK COUPLING

[75] Inventor: Alan J. Hannibal, Fairview, Pa.

[73] Assignee: Lord Corporation, Erie, Pa.

[21] Appl. No.: 180,247

[22] Filed: Aug. 22, 1980

[51] Int. Cl.³ ............................................... F16D 3/62
[52] U.S. Cl. .................................................... 464/69
[58] Field of Search ................ 64/12, 19; 464/69, 106

[56] References Cited

U.S. PATENT DOCUMENTS

| | | | |
|---|---|---|---|
| 1,424,051 | 7/1922 | Wayne | 64/12 |
| 2,561,117 | 7/1951 | Hoffer | 64/12 |
| 3,481,158 | 12/1969 | Mayerjak | 64/12 |
| 3,592,021 | 7/1971 | Mayerjak | 64/12 |
| 3,768,334 | 10/1973 | Ditlinger | 64/12 |
| 4,019,345 | 4/1977 | Fukuda | 64/12 |
| 4,019,346 | 4/1977 | Fukuda | 64/12 |
| 4,033,144 | 7/1977 | Allen | 64/12 |
| 4,203,303 | 5/1980 | Miller | 64/12 |
| 4,207,758 | 6/1980 | Stone | 64/12 |

*Primary Examiner*—Tony M. Argenbright
*Assistant Examiner*—Magdalen Moy

[57] ABSTRACT

A link coupling is provided by the present invention for transmitting rotary motion and accommodating misalignment between a drive and driven shaft. The coupling consists of a plurality of flexing structures connected together, each of which consists of individual link elements joined together in an offset configuration to form a compact, relatively flat structure. Forces applied by any misalignment of the drive and driven shafts are accommodated primarily by flexure of the links.

22 Claims, 8 Drawing Figures

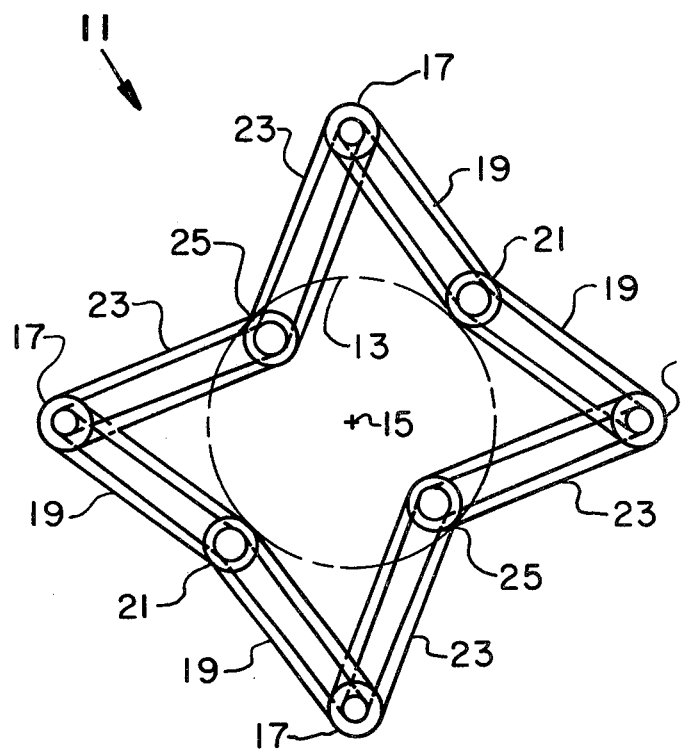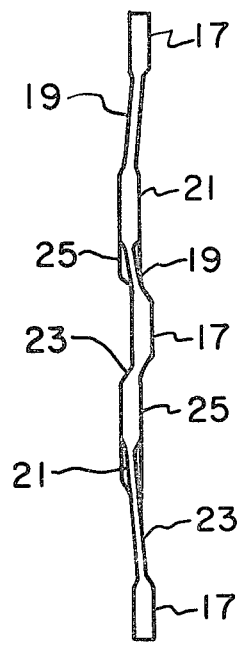
Figure 1  Figure 2
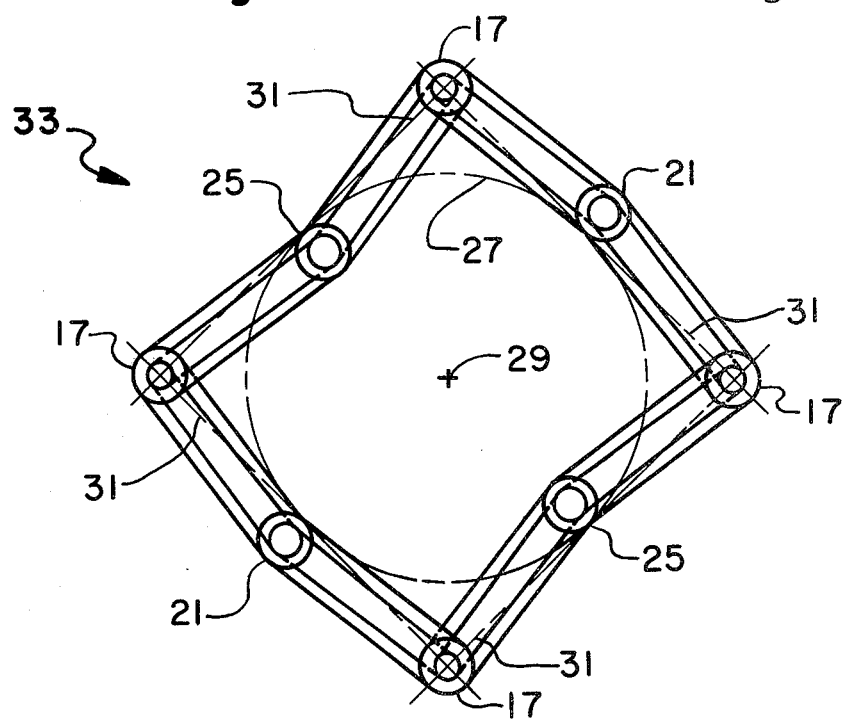
Figure 3

LINK COUPLING

FIELD OF THE INVENTION

The present invention relates to the field of link couplings, and, more specifically, to a flexible link coupling in which the individual link elements are joined in an offset configuration to form a compact, relatively flat structure such that any angular misalignment of the shafts to be coupled is accommodated primarily by flexure of the links.

BACKGROUND OF THE INVENTION

Flexible couplings for connecting adjoining shafts which may have their axes misaligned either through installation error or by design are well-known in the prior art and available for many applications. Most prior art flexible coupling designs, however, are limited in capability both as to durability and the degree of angular or axial misalignment permitted between the adjoining shafts (e.g. a drive shaft and load shaft). A few existing couplings utilize elastomeric material to accommodate misalignment, but they generally lack torsional stiffness and relative to their size can only transmit small amounts of torque. Conventional nonelastomeric types of flexible couplings, including the Cardan type of universal joint, permit a relatively high degree of shaft misalignment but do not provide a constant velocity relationship between the rotating shafts. Specialty universal joints have been designed to provide such a constant velocity relationship, but these joints include bearings and a seal which must be lubricated and are subject to failure.

As an alternative to prior art couplings utilizing elastomeric material, and those universal joints such as the Cardan type, link couplings have been developed to enhance angular and axial misalignment accommodation capability of the coupling while providing sufficient torsional strength. Link couplings include a plurality of individual, flexible link elements connected to one another by bolts, pins or similar means. The link elements are typically of equal length and form flexing structures consisting of a plurality of link elements connected together in a variety of symmetrical patterns including generally square or circular (i.e. octagonal, hexagonal) configurations. At least two flexing structures are joined together to form the link coupling, which in turn is connected at each end to the flange of the shafts to be joined.

The primary disadvantage of existing link couplings is that sufficient space must be provided between the link elements of adjacent flexing structures to permit insertion of the bolts or pins which join the ends of the link elements together. In addition, since the link elements are symmetrically disposed within each flexing structure, interference could occur between the bolts or pins of adjoining flexing structures in the event of axial or angular misalignment between the adjoining shafts.

One prior art solution to the problem of end connector interference between the link elements of adjoining flexing structures is described in U.S. Pat. No. 3,481,158 to Mayerjak and shown in FIG. 6. In Mayerjak the individual link elements are tapered or axially offset from end to end such that their end portions are sufficiently spaced apart to receive the connecting bolt or pin and also avoid interference with link elements of adjoining flexing structures in the event of axial or angular misalignment in the shafts to be coupled. The problem with this design is that in response to angular or axial misalignment of the adjoining shafts, the link elements in the Mayerjak and similar couplings are placed primarily in tension of compression (See FIG. 7B). As discussed more fully below, the link elements of a link coupling are much less susceptible to failure where they flex and end in response to shaft misalignment (See FIG. 7A) rather than undergoing tensile or compressive loading as is most commonly the case in the prior art.

SUMMARY OF THE INVENTION

The subject invention provides a link coupling including at least two flexing structures connected together, in which half of the end connectors of adjoining link elements in each flexing structure are disposed at alternating radial distances from the longitudinal axis of the adjoining shafts in a nonsymmetrical, offset pattern. Such a configuration enables the connecting bolts or rivets joining adjacent flexing structures to be readily inserted within the bores or bushings disposed at the ends of each link, and avoids interference between such end connections in the event of shaft misalignment. Moreover, with such an offset pattern the link elements may be formed in an essentially flat configuration in a plane nearly perpendicular to the longitudinal axes of the shafts to be coupled to the extent necessitated by angular and axial misalignment requirements of the coupling. As mentioned above, by reducing the taper in adjoining link elements as found in prior art couplings, the link elements are placed primarily in flexure in response to shaft misalignment rather than in tension or compression.

The offset pattern of the coupling herein may be achieved by alternately connecting shorter link elements to longer link elements such that the inwardly extending end of each shorter link element is disposed at a greater radial distance from the longitudinal axis of the adjoining shafts than the inwardly extending end of each longer link element. Alternatively, essentially equal length link elements may be connected in the offset pattern of the coupling herein as discussed in detail below.

Therefore, it is an object of the present invention to provide a flexible link coupling in which the pattern for connecting the inwardly extending end of the link elements in each flexing structure is offset in a radial direction relative to the longitudinal axis of the shafts to be coupled.

It is another object of the present invention to provide a link coupling in which the individual link elements are connected by bolts or pins in a compact configuration, due to an offset end connection pattern, such that the link elements of each flexing structure are disposed in a plane essentially perpendicular to the longitudinal axis of the adjoining shaft.

It is a further object of the present invention to provide a link coupling wherein adjoining flexing structures are disposed in a plane essentially perpendicular to the longitudinal axis of the adjoining shaft, such that the link elements of each flexing structure are placed in flexure in response to angular and axial misalignment of such shafts.

It is still another object of the present invention to provide a link coupling including at least one reinforcing ring to which selected link elements of adjoining flexing structures are attached to provide added torsional and radial rigidity to the coupling without sacrificing angular and axial misalignment accommodation capability.

DESCRIPTION OF THE DRAWINGS

Objects in addition to the foregoing will become apparent upon consideration of the following discussion taken in conjunction with the accompanying drawings wherein:

FIG. 1 is a partial front view of one embodiment of a flexing structure herein in which alternate pairs of link elements are of different lengths.

FIG. 2 is a side view of FIG. 1 showing the relatively planar orientation of the link elements.

FIG. 3 is a partial front view of a second embodiment of the flexing structure of subject invention in which the link elements are of essentially equal length.

DETAILED DESCRIPTION OF THE INVENTION

Figure 4:
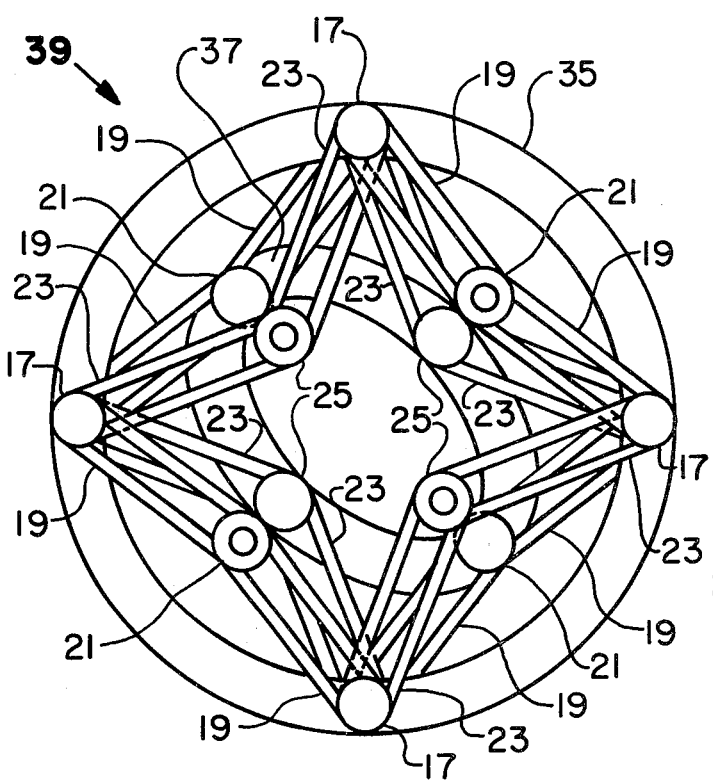
FIG. 4 is a front view of four individual flexing structures as shown in FIG. 1, connected by reinforcing rings to form the link coupling herein.

Referring now to the drawings, and in particular FIGS. 1 and 2, one embodiment of a flexing structure of the present invention is labelled generally with the reference 11. Flexing structure 11 includes a series of link elements having common end connectors, illustratively in the form of spaced bushings, which are joined together by a plurality of filaments formed of a high strength fibrous material such as aramid fiber, glass fiber or a suitable equivalent. In the preferred embodiment herein, the flexing structure 11 is formed by wrapping a single elongated fiber strand from bushing to bushing in a continuous operation. The fiber is first coated of impregnated with a matrix material such as epoxy, urethane or some other polymeric material and then laid down between the bushings in a prescribed sequence to form individual link elements having at each end thereof an end-connector bushing which is also shared by and common to the immediately adjacent link element. For purposes of discussion, a single wrap of the fiber between adjacent bushings will be considered as forming a single filament. The number of filaments used to form the link elements may be varied depending on the torque carrying and flexibility requirements of the particular application for which the coupling is to be utilized.

By forming the link elements of a plurality of filaments, a flexing structure 11 is provided which is capable of withstanding relatively high torque loads while being flexible to accommodate axial and angular misalignment of the shafts to be joined. Since each filament is separately coated or impregnated with matrix material, the filaments are free to move relative to one another thus permitting axial and angular flexing of each link element. It is contemplated, however, that solid metallic or solid filament wound link elements could be utilized in the flexing structure 11 herein and are considered within the scope of the subject invention. Although a degree of flexibility may be sacrificed by using solid metallic link elements, this may be entirely appropriate in applications wherein the misalignment between the shafts to be coupled is expected to be minimal.

In FIG. 1, the numerals 19 and 23 designate link elements of an endless single flexing structure 11, formed in the manner previously described, and the numerals 17, 21, and 25 designate end-connector bushing of such structure. An inner reference circle 13 having a center 15 is drawn in phantom in FIG. 1, to illustrate the unique spacing or offset of the link elements. In this embodiment of the present invention, four outer bushings 17 are symmetrically disposed about reference circle 13 at equal radial distances from the center 15. Four first link elements 19 attach at one end to respective ones of the outer bushings 17, and extend inwardly to attach at their other end to a pair of first inner bushings 21. The first inner bushings 21 are disposed tangent to and outside of the reference circle 13, and are spaced approximately 180° apart. Four second link elements 23 also attach at one end to respective ones of the outer bushings 17, but extend inwardly to attach at their other end to a pair of second inner bushings 25. The second inner bushings 25 are disposed tangent to and within reference circle 13, and are spaced approximately 180° from one another and 90° from each of the first inner bushings 21.

It will be observed that the offset pattern of flexing structure 11 is obtained by disposing the first inner bushings 21 tangent to but outside of reference circle 13, and the second inner bushings 25 tangent to and inside of reference circle 13. As discussed more fully below, the offset of first and second inner bushings 21 and 25 enables several flexing structures 11 to be joined together side-by-side to form the link coupling of the subject invention by providing a space for insertion of the connecting pins or bolts into the bushings of adjacent individual flexing structures 11.

Referring again to FIG. 1, it should be noted that the first link elements 19 connecting the outer bushings 17 with first inner bushings 21 are slightly shorter than the second link elements 23 connecting outer bushings 17 with second inner bushings 25. This is due, of course, to the difference in radial distances between the center 15 of reference circle 13 and the first and second inner bushings 21 and 25 respectively. In this embodiment of the subject invention, the differing lengths of first and second link elements 19 and 23 provides a flexing structure 11 having a relatively high degree of flexibility to accommodate angular misalignment between the shafts to be joined, while possibly sacrificing to a limited extent its ultimate torque carrying capability. The enhanced flexibility of flexing structure 11 may be attributed to the longer second link elements 23 which move or flex to a greater degree in response to loads created by shaft misalignment than the shorter, stiffer first link elements 19. While the flexibility and torque carrying capability of the first and second link elements 19 and 23 of FIG. 1 is different, it is not contemplated that such difference will affect the performance of flexing structure 11 or result in premature failure of either of the link elements 19 or 23.

A second embodiment of the flexing structure of the present invention, shown in FIG. 3 and labelled generally with the reference 33, has all of its link elements of equal length. This embodiment is similar to that shown in FIG. 1, except that the first and second inner bushings 21 and 25 of flexing structure 33 are extended radially outwardly from their location in FIG. 1 to points tangent with a chord 31 drawn between the centers of outer bushings 17. A second reference circle 27, having a center 29, may be drawn tangent to the chords 31 connecting the centers of outer bushings 17 to illustrate the offset pattern of this embodiment of the subject invention.

The first inner bushings 21 are spaced apart 180° and disposed outside of reference circle 27 at a point tangent to both the chords 31 and reference circle 27. The second inner bushings 25, spaced apart 180° relative to one another and 90° relative to each of the first inner bushings 21 are disposed inside of reference circle 27 at a point tangent to both the chords 31 and reference circle 27. The first and second inner bushings 21 and 25 of flexing structure 33 are disposed at different radial distances from the center of reference circle 27 as in FIG. 1, but since their centers are also equidistant from the chords 31 connecting the centers of outer bushings 17, the length of first and second link elements 19 and 23 are essentially equal in contrast to the flexing structure 11 of FIG. 1. The flexing structure 33 provided in this embodiment of the present invention thus exhibits slightly different properties than the coupling 11 of FIG. 1.

The link elements of flexing structure 33 are slightly shorter than any of the link elements of flexing structure 11 since they are disposed at greater radial distances from the longitudinal axis of the shafts to be joined, and are thus more nearly circumferentially aligned with outer bushings 17. As a result, flexing structure 33 exhibits a greater degree of torsional stiffness and less flexibility than flexing structure 11. Therefore, it is believed that the flexing structure 11 of FIG. 1 may be more advantageously used in a link coupling where more angular and axial misalignment accommodation is desired and the amount of torque carrying capability is not as critical. In contrast, the flexing structure 33 of FIG. 3 may be used to from a link coupling in which high torque carrying capability is required but angular misalignment between the shafts to be joined is expected to be minimal.

Figure 5:
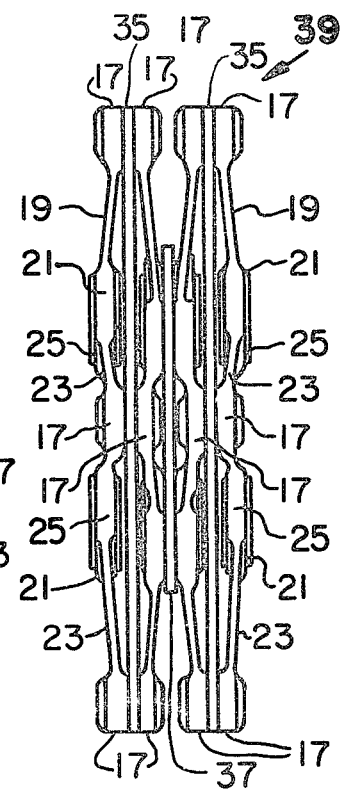
FIG. 5 is a side view of the link coupling of FIG. 4.

Referring now to FIGS. 4 and 5, four flexing structures 11 of the type shown in FIG. 1 are connected side-by-side to a pair of outer reinforcing rings 35 and a single inner reinforcing ring 37 disposed therebetween to form the coupling of the subject invention labelled generally with the reference 39. The angular misalignment accommodation capability of the individual flexing structures (11 and 33) is additive; that is, if one flexing structure 11 permits 2° of angular misalignment then four flexing structures 11 joined together in link coupling 39 will permit 8° of angular misalignment. Any number of flexing structures 11 or 33 of the subject invention may be joined in coupling 39 as shown in FIGS. 4 and 5 to provide the desired degree of angular misalignment accommodation. The reinforcing rings 35 and 37 add torsional and radial stiffness to the coupling 39 and preclude premature buckling, without sacrificing its inherent flexibility.

In viewing FIGS. 4 and 5, the advantages of the unique offset pattern of first and second inner bushings 21 and 25 may be observed. As mentioned above, by disposing the first and second inner bushings 21 and 25 at different radial distances from the centers 15 and 29 of reference circles 13 or 27 respectively (which correspond to the longitudinal axes of the shafts to be joined), coupling 39 may be freely rotated even under loads imposed by shaft misalignment without interference between bushings 21 and 25 of adjoining flexing structures 11 or 33. In addition, as several individual flexing structures 11 or 33 are joined together in a side-by-side relation to form coupling 39, the offset of inner bushings 21 and 25 enables bolts, pins or other connecting means to be readily inserted through the bushings of adjoining flexing structures 11 or 33 without interference. This would also be true where solid metallic or composite link elements are utilized. Moreover, by positioning the first inner bushings 21 at a longer radial distance from the center of flexing structures 11 and 33 than the second inner bushings 25, the flexing structures 11 and 33 may be formed in a relatively flat or planar configuration with each link element being more nearly perpendicular to the longitudinal axis of the shafts to be joined than was previously possible in prior art couplings. (See FIGS. 2 and 5).

Figure 6:
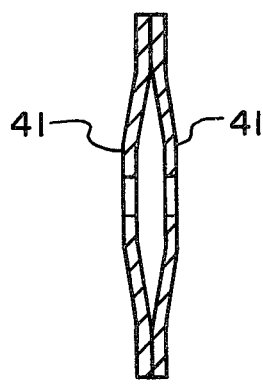
FIG. 6 is a side view of one prior art configuration of the link elements in a flexing structure having a symmetrical bolt pattern.
Figure 7A:
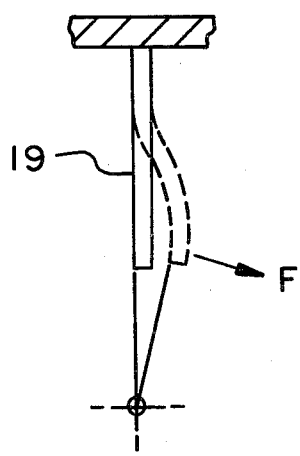
FIG. 7A is a free body diagram of the reaction of a link element of the subject invention to an applied force.
Figure 7B:
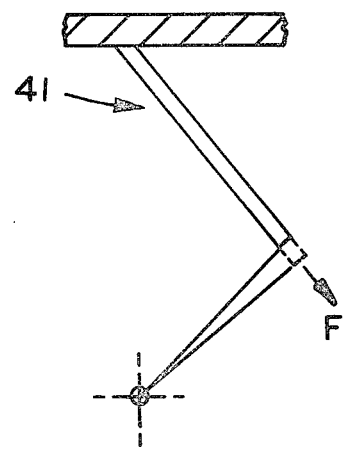
FIG. 7B is a free body diagram of the reaction of a link element in FIG. 6 to an applied force.

As mentioned above, prior art link couplings generally utilize tapered link elements 41 to permit joining of individual structures of flexing elements in a side-by-side relation . (See FIG. 6.) Without tapering the link elements 41 in such couplings, it would be extremely difficult to insert the bolts or rivets necessary to connect the ends of the bushings of adjoining flexing elements. While tapered link elements 41 provide the needed space to permit insertion of the end connectors, the link elements 41 of such couplings are placed primarily in tension or compression in response to loads imposed by shaft misalignment. (See FIG. 7B.) In contrast, the relatively planar configuration of the link elements 19 and 23 in flexing elements 11 and 33 herein, made possible by the offset of bushings 21 and 25, enables the link elements 19 and 23 to flex and bend in response to such shaft misalignment forces (FIG. 7A) which is clearly preferable in terms of reducing potential failure of the link elements when compared to the tension/compression loading of link elements in prior art couplings.

Both of the flexing structures 11 and 33 of the subject invention have been illustrated in the Figures as including eight bushings and eight link elements. It should be understood that other even numbers of bushings and link elements could be utilized to form such flexing structures 11 and 33 having the offset pattern described herein. Of course, the spacing between adjacent outer bushings 17 and first and second inner bushings 21 and 25 would be different where other than eight bushings were utilized, but the offset pattern of the inner bushings would be unchanged. In addition, it is contemplated that at least two flexing structures must be utilized to form the coupling 39 herein, and the four flexing structure embodiment of FIGS. 4 and 5 is shown for purposes of illustration only. It should also be noted that the outwardly facing first and second inner bushings 21 and 25 on each side of coupling 39 shown in FIG. 5, form the connection of coupling 39 to the drive and driven shafts (not shown). This is also the case for couplings 39 in which any other even number of flexing structures 11 or 33 are utilized.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A link coupling for transmitting rotary motion from a drive member to a driven member about a longitudinal axis generally aligned with the axes of said drive and driven members, said link coupling comprising:

at least two polygonally shaped flexing structures encircling said axis at closely adjacent locations along the length thereof between said drive and driven members, each of said flexing structures including at least eight sequentially arranged link elements and associated end connectors;

connecting means, cooperable with said end connectors, for joining said flexing structures together to form said link coupling and for joining said coupling to said drive and driven members;

said end connectors of each one of said flexing structures including a plurality of outer end connectors symmetrically disposed at an equal radial distance about said longitudinal axis, at least two first inner end connectors each disposed at a first radial distance from said longitudinal axis, and at least two second inner end connectors each disposed at a second radial distance from said longitudinal axis, said first radial distance being greater than said second radial distance and less than said radial distance between said axis and said outer end connectors;

said inner end connectors of each of said flexible structures being arcuately spaced about said axis from each other at approximately equal arc intervals;

said link elements of each of said flexible structures including first link elements disposed between and connecting respective ones of said outer end connectors and said first inner end connectors, and second link elements disposed between and connecting respective ones of said outer end connectors and said second inner end connectors.

2. The link coupling of claim 1, wherein said first radial distance is greater than said second radial distance by an amount at least equal to the diameter of said first and second inner end connectors.

3. The link coupling of claim 1 wherein said link elements are formed of a plurality of parallel filaments coated or impregnated with a matrix material, said filaments being wrapped around and attaching to said outer end connectors and inner end connectors to form said first and second link elements.

4. The link coupling of claim 1 wherein said link elements are formed of a solid, flexible material having end connector bores therein.

5. The link coupling of claim 1 wherein said first link elements connecting respective ones of said outer end connectors with said first inner end connectors are shorter and stiffer than said second link elements connecting respective ones of said outer end connectors with said second inner end connectors.

6. The link coupling of claim 1 and further including reinforcing ring means disposed between adjacent ones of said flexing structures for enhancing the torsional and radial stiffness of said coupling and to preclude buckling of said flexing structures.

7. The link coupling of claim 6 wherein said reinforcing ring means comprises reinforcing rings numbering one less than the number of flexing structures.

8. The link coupling of claim 1 wherein said connecting means includes pins, rivets or bolts insertable through said inner and outer end connectors.

9. The link coupling of claim 1 wherein said end connectors are bushings.

10. A link coupling for transmitting rotary motion about a longitudinal axis from a drive member to a driven member, said link coupling comprising at least two flexing structures each including a plurality of outer end connectors symmetrically disposed at an equal radial distance about said longitudinal axis, two first inner end connectors each disposed at a first radial distance from said longitudinal axis, two second inner end connectors each disposed at a second radial distance from said longitudinal axis, said first radial distance being greater than said second radial distance, each one of said first inner end connectors being spaced 90° apart from said two second inner end connectors and 180° apart from each other, first link elements disposed between and connecting respective ones of said outer end connectors and said first inner end connectors, second link elements disposed between and connecting respective ones of said outer end connectors and said second inner end connectors, connecting means for joining said flexing structures together to form said link coupling.

11. The link coupling of claim 10 wherein said first radial distance is greater than said second radial distance by an amount equal to the diameter of said first and second inner end connectors.

12. The link coupling of claim 10 wherein said link elements are formed of a plurality of parallel filaments coated or impregnated with a matrix material, said filaments being wrapped around and attaching to said outer end connectors and said inner end connectors to form said first and second link elements.

13. The link coupling of claim 10 wherein said link elements are formed of a solid, flexible material having bores formed at each end.

14. The link coupling of claim 10 wherein said first link elements connecting respective ones of said outer end connectors with said first inner end connectors are shorter and stiffer than the second link elements connecting respective ones of said outer end connectors with said second inner end connectors.

15. The link coupling of claim 10 wherein said first inner end connectors are disposed tangent to a chord extending between the centers of two adjacent outer end connectors at said first radial distance from said longitudinal axis, and said second inner end connectors are disposed tangent to said chord at said second radial distance from said longitudinal axis, said first radial distance being greater than said second radial distance by an amount equal to the diameter of said first and second inner end connectors such that said first and second link elements are essentially equal in length.

16. The link coupling of claim 10 and further including a reinforcing ring, said flexing structures attaching in a side-by-side relation to said reinforcing ring for enhancing the torsional stiffness of said coupling and to preclude buckling of said flexing structures.

17. The link coupling of claim 11 wherein said connecting means includes pins, rivets or bolts insertable through said inner and outer end connectors of adjacent flexing structures to connect said flexing structures together for forming said link coupling.

18. The link coupling of claim 10 wherein said end connectors are bushings.

19. A link coupling for transmitting rotary motion about a lonigutudinal axis from a drive member to a driven mmeber, said link coupling comprising at least two flexing structures each including a plurality of outer end connectors symmetrically disposed at an equal radial distance about said longitudinal axis, at least two first inner end connectors each disposed at a first radial distance from said longitudinal axis and tangent to a chord extending between the centers of two adjacent outer end connectors, at least two second inner end connectors disposed at a second radial distance from said longitudinal axis and tangent to said chord, said first radial distance being greater than said second radial distance by an amount equal to the diameter of said inner end connectors, each one of said first inner end connectors being disposed at a spaced interval between two second inner end connectors, and each one of said second inner end connectors being disposed at said spaced interval between two first inner end connectors, first link elements disposed between and connecting respective ones of said outer end connectors and said first inner end connectors, second link elements disposed between and connecting respective ones of said outer end connectors and said second inner end connectors, connecting means for joining said flexing structures together to form said link coupling.

20. A link coupling for transmitting rotary motion from a drive member to a driven member about a longitudinal axis generally aligned with the axes of said drive and driven members, said link coupling comprising:
at least two flexing structures encircling said axis and extending substantially perpendicularly thereto at spaced locations along the length thereof between said drive and driven members, each of said flexing structures including alternately arranged link elements and associated end connectors;
connecting means, cooperable with said end connectors, for joining said flexing structures together to form said coupling and for joining said coupling to said drive and driven members;
said end connectors of each one of said flexing structures including a plurality of outer end connectors symmetrically disposed at an equal radial distance about said longitudinal axis, at least two first inner end connectors each disposed at a first radial distance from said longitudinal axis, and at least two second inner end connectors each disposed at a second radial distance from said longitudinal axis, said first radial distance being sufficiently greater than said second radial distance as to space said first and second inner end connectors from each other relative to said longitudinal axis, and said first radial distance being less than said radial distance between said axis and said outer end connectors;
said inner end connectors of each of said flexible structures being arcuately spaced about said axis from each other at approximately equal arc intervals;
said link elements of each of said flexible structures including first link elements disposed between and connecting respective ones of said outer end connectors and said first inner end connectors, and second link element disposed between and connecting respective ones of said outer end connectors and said second inner end connectors;
said first inner end connectors being disposed tangent to a chord extending between the centers of two adjacent outer end connectors at said first radial distance from said longitudinal axis, and said second inner end connectors being disposed tangent to said chord at said second radial distance from said longitudinal axis, said first radial distance being greater than said second radial distance by an amount equal to the diameter of said first and second inner end connectors such that said first and second link elements are essentially equal in length.

21. A link coupling for transmitting rotary motion from a drive member to a drive member about a longitudinal axis generally aligned with the axes of said drive and driven members, said link coupling comprising:
at least two flexing structures encircling said axis at spaced locations along the length thereof between said drive and driven members, each of said flexing members including alternately arranged link elements and associated end connectors;
annular reinforcing means disposed between adjacent ones of said flexible members structures for enhancing the radial and torsional stiffness of said coupling;
connecting means, cooperable with said end connectors, for joining said flexing structures and said reinforcing means together to form said coupling and for joining said coupling to said drive and driven members;
said end connectors of each one of said flexing structures including a plurality of outer end connectors symmetrically disposed at an equal radial distance about said longitudinal axis, at least two first inner end connectors each disposed at a first radial distance from said longitudinal axis, and at least two second inner end connectors each disposed at a second radial distance from said longitudinal axis, said first radial distance being greater than said radial distance and less than said radial distance between said axis and said outer end connectors;
said inner end connectors of each of said flexible structures being arcuately spaced about said axis from each other at approximately equal arc intervals;
said link elements of each of said flexible structures including first link elements disposed between and connecting respective ones of said outer end connectors and said first inner end connectors, and second link elements disposed between and connecting respective ones of said outer end connectors and said second inner end connectors;
said first inner end connectors being disposed tangent to a chord extending between the centers of two adjacent outer end connectors at said first radial distance from said longitudinal axis, and said second inner end connectors being disposed tangent to said chord at said second radial distance from said longitudinal axis, said first radial distance being greater than said second radial distance by an amount equal to the diameter of said first and second inner end connectors such that said first and second link elements are essentially equal in length.

22. A link coupling for transmitting rotary motion from a drive member to a driven member about a longitudinal axis generally aligned with the axes of said drive and driven members, said link coupling comprising:

at least two flexing structures encircling said axis at spaced locations along the length thereof between said drive and driven members, each of said flexing structures including alternately arranged link elements and associated end connectors;

connecting means, cooperable with said end connectors, for joining said flexing structures together to form said coupling and for joining said coupling to said drive and driven members;

said end connectors of each one of said flexing structures including a plurality of outer end connectors symmetrically disposed at an equal radial distance about said longitudinal axis, at least two first inner end connectors each disposed at a first radial distance from said longitudinal axis, and at least two second inner end connectors each disposed at a second radial distance from said longitudinal axis, said first radial distance being greater than said second radial distance and less than said radial distance between said axis and said outer end connectors;

said inner end connectors of each of said flexible structures being arcuately spaced about said axis from each other at approximately equal arc intervals;

said link elements of each of said flexible structures including first link elemwents disposed between and connecting respective ones of said outer end connectors and said first inner end connectors, and second link elements disposed between and connecting respective ones of said outer end connectors and said second inner end connectors;

said first inner end connectors being disposed tangent to a chord extending between the centers of two adjacent outer end connectors at said first radial distance from said longitudinal axis, and said second inner end connectors being disposed tangent to said chord at said second radial distance from said longitudinal axis, said first radial distance being greater than said second radial distance by an amount equal to the diameter of said first and second inner end connectors such that said first and second link elements are substantially equal in length.

* * * * *